US009983910B2

(12) United States Patent
Lee et al.

(10) Patent No.: US 9,983,910 B2
(45) Date of Patent: May 29, 2018

(54) METHOD AND PROCESSOR FOR IMPLEMENTING THREAD AND RECORDING MEDIUM THEREOF

(71) Applicants: Samsung Electronics Co., Ltd., Suwon-si (KR); Korea Advanced Institute of Science and Technology, Daejeon (KR)

(72) Inventors: Minseok Lee, Daejeon (KR); John Dongjun Kim, Daejeon (KR); Woong Seo, Hwaseong-si (KR); Soojung Ryu, Hwaseong-si (KR); Yeongon Cho, Hwaseong-si (KR)

(73) Assignees: SAMSUNG ELECTRONICS CO., LTD., Suwon-si, Gyeonggi-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 122 days.

(21) Appl. No.: 15/146,044

(22) Filed: May 4, 2016

(65) Prior Publication Data
US 2016/0335125 A1 Nov. 17, 2016

(30) Foreign Application Priority Data
May 15, 2015 (KR) .......................... 10-2015-0068191

(51) Int. Cl.
*G06F 9/46* (2006.01)
*G06F 9/50* (2006.01)

(52) U.S. Cl.
CPC ................. *G06F 9/5038* (2013.01)

(58) Field of Classification Search
CPC ...................................... G06F 9/5038
See application file for complete search history.

(56) References Cited

U.S. PATENT DOCUMENTS

| 6,631,413 | B1 * | 10/2003 | Aggarwal | G06Q 10/08 |
| | | | | 709/219 |
| 8,732,711 | B2 | 5/2014 | Dally et al. | |
| 8,935,599 | B2 * | 1/2015 | Nemazie | G06F 11/1008 |
| | | | | 714/763 |
| 2003/0233392 | A1 * | 12/2003 | Forin | G06F 9/485 |
| | | | | 718/107 |

(Continued)

FOREIGN PATENT DOCUMENTS

| CN | 103336718 A | 10/2013 |
| KR | 10-2012-0083000 A | 7/2012 |

(Continued)

*Primary Examiner* — Camquy Truong
(74) *Attorney, Agent, or Firm* — F. Chau & Associates, LLC

(57) ABSTRACT

A processor and corresponding method are described including cores having a thread set allocated based on a pre-set implementation order, and a controller configured to receive scheduling information determined based on an implementation pattern regarding the allocated thread set from one of the cores and transmit the scheduling information to another of the cores. The one of cores determines the scheduling information according to characteristics of an application when implementation of the thread set is completed. Each of the cores re-determines an implementation order regarding the allocated thread set based on the determined scheduling information.

14 Claims, 7 Drawing Sheets

(56) References Cited

U.S. PATENT DOCUMENTS

| | | | | |
|---|---|---|---|---|
| 2004/0268354 A1* | 12/2004 | Kanai | ................. | G06F 9/45533 718/100 |
| 2011/0126200 A1* | 5/2011 | Krieger | ................. | G06F 9/5033 718/102 |
| 2012/0042327 A1* | 2/2012 | Gokhale | ................... | G06F 9/52 719/330 |

FOREIGN PATENT DOCUMENTS

| | | | |
|---|---|---|---|
| KR | 10-1369352 | B1 | 3/2014 |
| KR | 10-1420592 | B1 | 7/2014 |

\* cited by examiner

METHOD AND PROCESSOR FOR IMPLEMENTING THREAD AND RECORDING MEDIUM THEREOF

CROSS-REFERENCE TO RELATED APPLICATION

This application claims the benefit under 35 USC 119(a) of Korean Patent Application No. 10-2015-0068191, filed on May 15, 2015, in the Korean Intellectual Property Office, the disclosure of which is incorporated herein in its entirety by reference.

BACKGROUND

1. Field

The following description relates to a method of implementing threads, a processor for implementing threads, and a computer program embodied on a non-transitory computer readable medium, the computer program being configured to control a processor to implement the method of implementing threads.

2. Description of Related Art

As information technologies (IT) are developed, a number of various application programs requiring complicated calculations is increasing. Furthermore, as sophisticated terminals are further developed, terminals with multi core processors are replacing terminals with single core processors. Furthermore, a method to parallel process application programs is changing from a time division multiplexing thread processing method, on a single core processor, to a processing method that simultaneously processes multi threads, on a multi core processor in parallel.

In a multi-thread processing environment, in accord with a particular application to be performed, a terminal generates threads of a same form and implements the threads on a core of the terminal. Threads may be implemented by time-dividing a core on a single core. Also, threads may be implemented on multi cores of a terminal in parallel by allocating respective multi-threads to the multi cores of the terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a processor, including: cores including a thread set allocated based on a pre-set implementation order; and a controller configured to receive scheduling information determined based on an implementation pattern regarding the allocated thread set from one of the cores and transmit the scheduling information to another of the cores, wherein the one of cores determines the scheduling information according to characteristics of an application when implementation of the thread set is completed, and each of the cores re-determines an implementation order regarding the allocated thread set based on the determined scheduling information.

The processor may also include a memory configured to store thread sets to implement the application.

The one of the cores is a core at which implementation of a selected thread set from among allocated thread sets may be completed for a first place.

The selected thread set may be the thread set allocated to the one of the cores for the first place.

The one of the cores determines scheduling information based on the implementation order obtained when implementation of a selected thread set from among allocated thread sets may be completed.

In response to an implementation pattern of the thread set being a first pattern, the one of the cores may select a greedy-then-oldest (GTO) scheduling technique, and, in response to an implementation pattern regarding the thread sets being a second pattern, the one of the cores may select a round-robin (RR) scheduling technique.

Each of the cores may re-determine an implementation order of thread sets, including incomplete implementations, based on the scheduling information.

In response to the pre-set scheduling information not being identical to the determined scheduling information, one of the other cores may change the implementation order based on a scheduling technique indicated by the determined scheduling information.

The processor may be a graphic processor.

In accordance with an embodiment, there is provided a method of implementing threads on a processor, the method including: implementing a thread set allocated to a core to implement an application based on a pre-set implementation order; determining scheduling information based on characteristics of the application in response to implementation of the thread set being completed; transmitting the determined scheduling information to a controller operatively connected to cores including the core; and re-determining an implementation order of the allocated thread set based on the determined scheduling information.

The one of the cores may be a core at which implementation of a selected thread set from among allocated thread sets is completed for a first place.

The selected thread set may be the thread set allocated to the core for the first place.

In the determining of the scheduling information may include determining the scheduling information based on the implementation order obtained in response to implementation of the selected thread set being completed.

In response to an implementation pattern of the thread set being a first pattern, the method may include: selecting a greedy-then-oldest (GTO) scheduling technique.

In response to an implementation pattern of the thread set being a second pattern, the method may include: selecting a round-robin (RR) scheduling technique.

The re-determining of the implementation order may include re-determining thread sets including incomplete implementations based on the scheduling information.

The re-determining of the implementation order may include in response to the pre-set scheduling information not being identical to the determined scheduling information, changing the implementation order based on a scheduling technique indicated by the determined scheduling information.

The processor may be a graphic processor.

In accordance with an embodiment, there is provided a computer program embodied on a non-transitory computer readable medium, the computer program being configured to control a processor to perform the method described above.

Other features and aspects will be apparent from the following detailed description, the drawings, and the claims.

BRIEF DESCRIPTION OF THE DRAWINGS

These and/or other aspects will become apparent and more readily appreciated from the following description of the exemplary embodiments, taken in conjunction with the accompanying drawings in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, various embodiments will be described in detail with reference to accompanying drawings.

Figure 1:
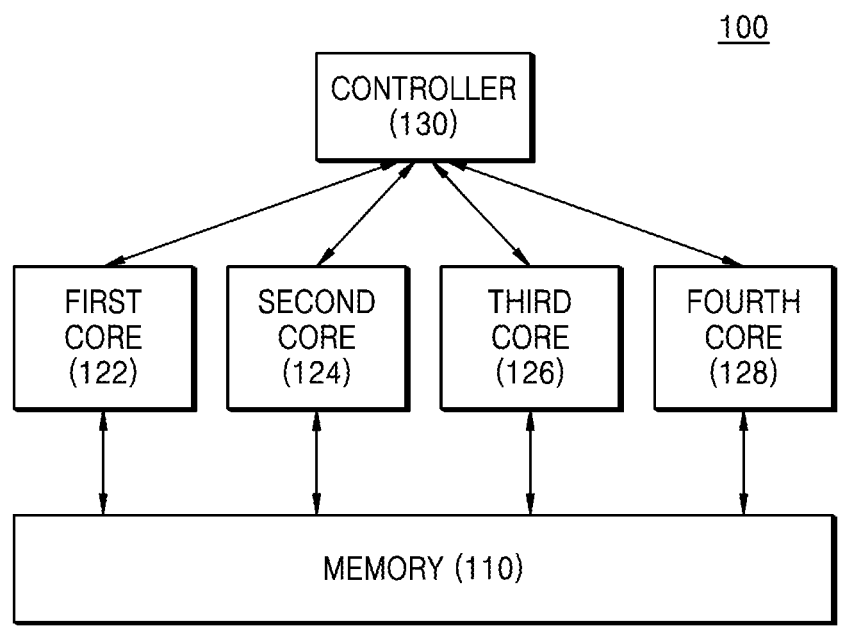
FIG. 1 is a diagram showing a processor, according to an embodiment.

FIG. 1 is a diagram showing a processor 100, according to an embodiment.

Only components related to the embodiment are shown in the processor 100 of FIG. 1. Therefore, ordinary person of skill in the art would appreciate that the processor 100 may further include other structural components in addition to the components shown in FIG. 1.

Referring to FIG. 1, the processor 100 includes a memory 110, a plurality of cores 122, 124, 126, and 128, and a controller 130.

The processor 100 is used in computing systems including, but not limited to, a personal computer, an entertainment system, a media system, a game system, a communication device, and a personal digital assistant (PDA). For example, the processor 100 is a graphic processor.

The memory 110, according to an embodiment stores a plurality of thread sets to perform or to execute an application. In one example, the application refers to a program that is allocated to the processor 100 and implemented thereon. Furthermore, an application includes a plurality of implementing processors. In an embodiment, an implementing processor is referred to as a thread. A thread refers to a single control flow to independently perform a command constituting an application. The thread is a sequence of computing instructions that makes up a process or a program.

Furthermore, the memory 110, according to an embodiment, stores a plurality of threads by thread sets. In one example, the thread set is determined based on a number of threads allocated to the plurality of cores 122, 124, 126, and 128 included in the processor 100. For example, a thread set is a warp or a thread block.

The memory 110 allocates at least one or more thread sets, including a plurality of threads, to each of the plurality of cores 122, 124, 126, and 128. Each of the plurality of cores 122, 124, 126, and 128 includes at least one processing unit or at least one processor. Each processor executes at least one or more thread sets. For example, the processor executes at least one or more thread sets and executes another thread set after the execution of the at least one or more thread sets is completed in a pre-set order.

Each of the plurality of cores 122, 124, 126, and 128, according to an embodiment, determines an order to execute at least one or more thread sets allocated thereto according to a pre-set scheduling technique. Examples of scheduling techniques include a greedy-then-oldest (GTO) scheduling technique and a round-robin (RR) scheduling technique. The GTO scheduling technique refers to a scheduling technique for continuously executing a first allocated thread set at higher priority than other thread sets. On the other hand, the RR scheduling technique is a technique to equally execute at least one or more thread sets one-by-one in turn. However, the above-stated scheduling techniques are merely examples, and scheduling techniques applicable to the plurality of cores 122, 124, 126, and 128 are not limited thereto.

In addition, based on a relationship between at least one or more thread sets to implement applications, a scheduling technique optimized for an application differs from a scheduling technique optimized for another application. For example, based on whether a relationship between at least one or more thread sets is a parallel relationship or a subordinative relationship, a scheduling technique optimized for at least one or more thread sets differs from a scheduling technique optimized for the other thread set(s).

Each of the plurality of cores 122, 124, 126, and 128 determines a scheduling technique optimized for at least one or more thread sets allocated thereto based on an implementation pattern in which the at least one or more thread sets are implemented. The implementation pattern is determined based on a distribution of numbers of times that threads included in other thread sets are implemented or executed until implementation of a selected thread set selected from among at least one or more thread sets allocated to each of cores is completed. Furthermore, a selected thread set is the first thread set allocated to each of the cores. Detailed descriptions of an implementation pattern will be given below with reference to FIG. 6A and FIG. 6B.

The controller 130 receives scheduling information from any one of the plurality of cores 122, 124, 126, and 128.

The controller 130, according to an embodiment, transmits the received scheduling information to the other cores 124, 126, and 128 from among the plurality of cores 122, 124, 126, and 128. A controller 130, according to another embodiment, transmits the received scheduling information to all of the plurality of cores 122, 124, 126, and 128.

Each of the plurality of cores 122, 124, 126, and 128 may re-determine or re-define an order to execute at least one or more thread sets allocated thereto, based on determined scheduling information. For example, each of the plurality of cores 122, 124, 126, and 128 may re-determine an order to execute a thread set, of which execution is not completed, from among at least one or more thread sets allocated thereto. If a pre-set implementation order is different from a re-determined implementation order, each of the cores 122, 124, 126, and 128 changes an order of execution of the threads that have not yet been executed.

Figure 2:
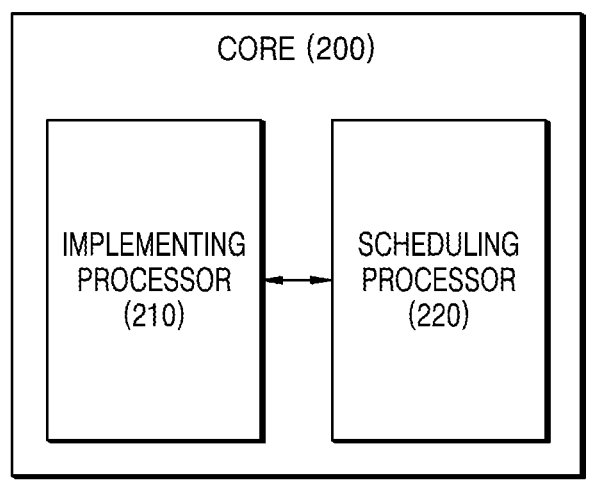
FIG. 2 is a block diagram of a core, according to an embodiment.

FIG. 2 is a block diagram of a core 200, according to an embodiment.

Only components related to the embodiment are shown in the core 200 of FIG. 2. Therefore, a person of relevant skill in the art will appreciate that the core 200 may further include other structural components or elements other than those structural components or elements shown in FIG. 2.

Referring to FIG. 2, the core 200 may include an implementing processor 210 and a scheduling processor 220. In one example, the core 200 may be any one of the plurality of cores 122, 124, 126, and 128 described above with reference to FIG. 1.

In one example, the implementing processor 210 includes a plurality of implementing processors (not shown). In another example, the implementing processor 210 includes a single processor. The implementing processor 210 implements or executes at least one or more thread sets allocated by a memory (memory 110 as illustrated in FIG. 1, for example). The implementing processor 210, according to an embodiment, determines an implementation order regarding at least one or more thread sets allocated thereto according to a pre-set scheduling technique. For example, the implementing processor 210 determines an implementation order or an execution order according to the GTO scheduling technique, such that the $0^{th}$ thread set, which is the thread set allocated to the first place, is implemented at the highest priority.

Also, a pre-set scheduling technique of the implementing processor 210 may be changed. For example, the implementing processor 210 obtains determined scheduling information from the scheduling processor 220, as described below, and changes a scheduling technique. In another example, the implementing processor 210 obtains scheduling information determined by another core from the controller 130, as described above with reference to FIG. 1, and changes a scheduling technique.

The scheduling processor 220 records implementation information regarding at least one or more thread sets allocated thereto. For example, the scheduling processor 220 records identification information regarding threads implemented in each of at least one or more thread sets or a number of threads of which implementations are completed.

Furthermore, the scheduling processor 220, according to an embodiment, monitors whether implementations of threads included in a selected thread set are completed. Hereinafter, for illustrative purposes, it is assumed that the selected thread set is the $0^{th}$ thread set, which is the thread set that is allocated to the core 200 at a first place or at a first position.

If implementation of the $0^{th}$ thread set is completed before scheduling information is determined by any one of the other cores, the scheduling processor 220 selects a scheduling technique based on an implementation pattern of at least one or more thread sets allocated thereto.

For example, in response to a distribution of numbers of implementations or executions of threads in respective allocated thread sets until completion of implementation of the $0^{th}$ thread set exhibits a concave pattern, the scheduling unit 220 selects the GTO scheduling technique. In another example, in response to a distribution of numbers of implementations or executions of threads in respective allocated thread sets until completion of implementation of the $0^{th}$ thread set exhibits a convex pattern, the scheduling unit 220 selects the RR scheduling technique.

The scheduling processor 220, according to an embodiment, transmits scheduling information indicating a determined scheduling technique to a controller (not shown). The scheduling information is transmitted to at least one of the other cores. Furthermore, the implementing unit 210 of the core 200 re-determines an implementation order regarding thread sets that have not been completely implemented or executed, from among at least one or more thread sets and according to the scheduling technique selected by the scheduling unit 220.

For example, in response to a pre-set scheduling technique being different from a selected scheduling technique, the implementing unit 210 determines an implementation order regarding thread sets that have not been completely implemented or executed, from among at least one or more thread sets. In another example, in response to a pre-set scheduling technique being identical to a selected scheduling technique, the implementing unit 210 maintains the pre-set scheduling technique.

In another example, in response to scheduling information determined by another core being received by the implementing unit 210, prior to the scheduling unit 220 of the core 200 determining an optimized scheduling technique, the implementing unit 210 re-determines an implementation order of the thread sets that have not been completely implemented or executed, based on the received scheduling information.

Figure 3:
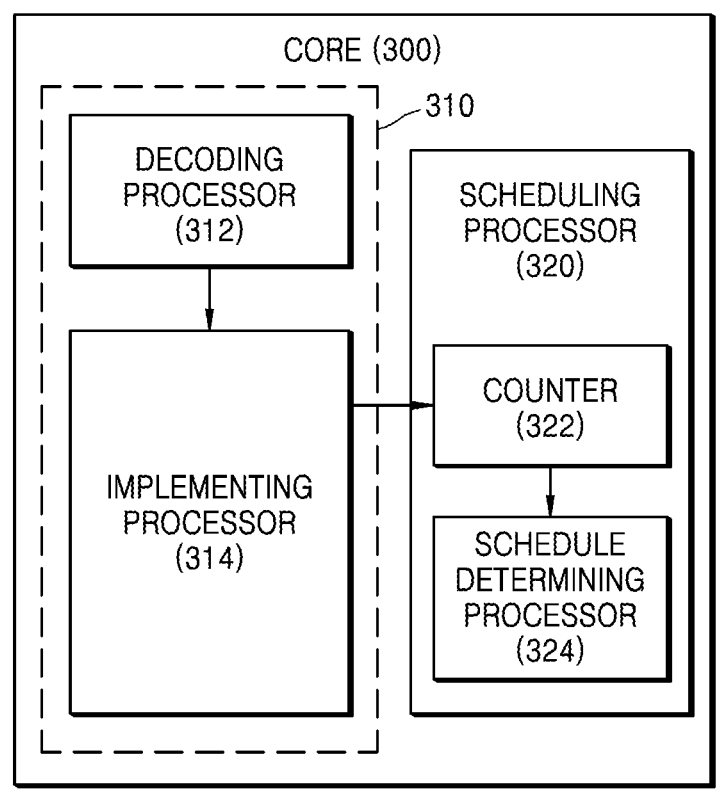
FIG. 3 is a block diagram of a core, according to another embodiment.

FIG. 3 is a block diagram of a core 300, according to another embodiment.

Only components related to the embodiment are shown in the core 300 of FIG. 3. However, a person skilled in the art will appreciate that the core 300 may further include additional structural components other than the structural components shown in FIG. 3.

Referring to FIG. 3, the core 300 includes a core pipeline 310 and a scheduling processor 320. Also, the core 300 may be any one of the cores 122, 124, 126, and 128 described above with reference to FIG. 1.

The core pipeline 310, according to an embodiment, includes a decoding processor 312 and an implementing processor 314.

The decoding processor 312 decodes data read out by accessing a memory (such as, memory 110 illustrated in FIG. 1) to a machine language that may be processed by the implementing processor 314. Based on a result from the decoding processor 312 decoding data read out from the memory, at least one or more thread sets allocated to the core 300 are input to the implementing processor 314. Further, a separate fetching processor to read out data from the memory is positioned between the memory and the decoding processor 312. However, detailed descriptions thereof will be omitted in the embodiment.

The implementing processor 314 implements at least one or more thread sets generated by the decoding processor 312 according to a pre-set implementation order. For example, the implementing processor 314 determines an implementation order according to the GTO scheduling technique, such that the $0^{th}$ thread set, which is the thread allocated for the first place, is implemented at the highest priority. Furthermore, the implementing processor 314 may change a scheduling technique based on scheduling information obtained by the scheduling processor 320 or another core.

Further, the implementing processor 314 corresponds to the scheduling processor 220 described above with respect to FIG. 2.

The scheduling processor 320 includes a counter 322 and a schedule determining processor 324. However, other structural components of the scheduling processor 320 may be further included.

The counter 322 identifies and records a number of threads implemented by the implementing processor 314 according to types of thread sets including the threads. For example, the counter 322 records a number of threads implemented in each of eight thread sets allocated to the core 300.

The schedule determining processor 324 obtains information regarding numbers of threads implemented in the respective thread sets from the counter 322. The schedule determining processor 324 determines an implementation pattern based on a distribution of numbers of threads implemented in the respective thread sets. For example, in response to numbers of threads implemented in the respective thread sets being evenly distributed, the schedule determining processor 324 determines that the corresponding implementation pattern is a convex implementation pattern. In another example, in response to numbers of implemented threads being concentrated at threads that are allocated earlier than the other thread sets, the schedule determining processor 324 determines that the corresponding implementation pattern is a concave implementation pattern.

The schedule determining processor 324 selects a scheduling technique optimized to the at least one or more allocated thread sets, based on the determined implementation pattern. For example, in response to the determined implementation pattern being a convex pattern, the schedule determining processor 324 selects the RR scheduling technique. In another example, in response to the determined implementation pattern being a concave pattern, the schedule determining processor 324 selects the GTO scheduling technique. However, the scheduling techniques are not limited thereto and other scheduling techniques may be used.

The schedule determining processor 324, according to an embodiment, transmits scheduling information indicating the determined scheduling technique to a controller (such as, the controller 130 of FIG. 1). Scheduling information is transmitted to at least one of the other cores via the controller.

Figure 4:
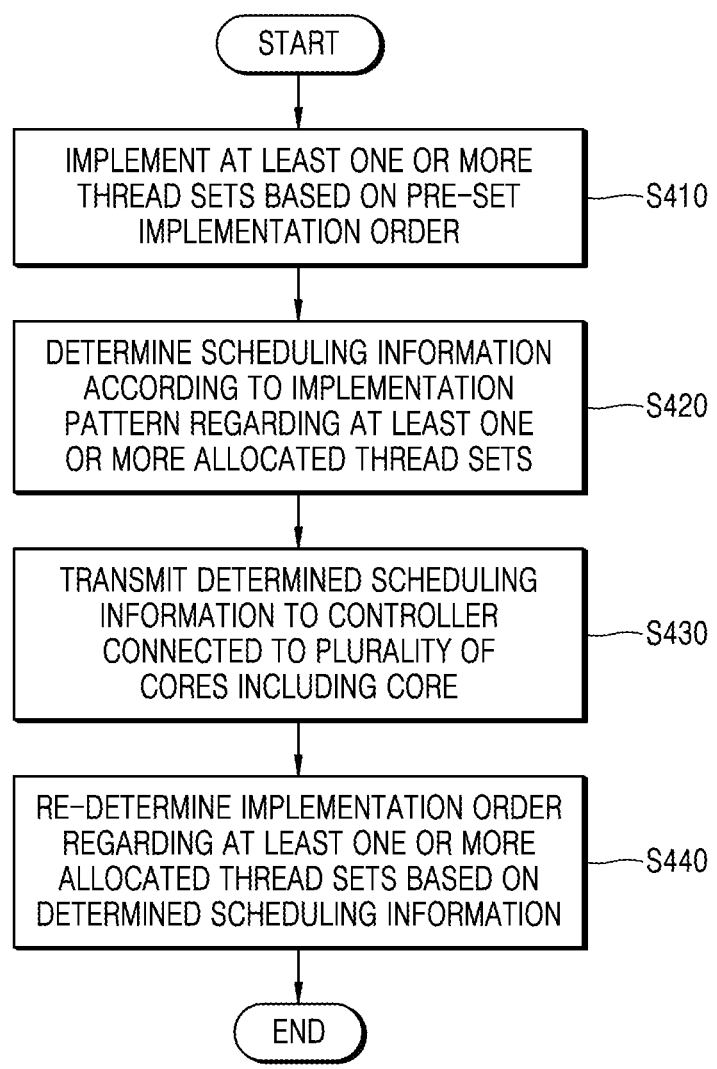
FIG. 4 is a flowchart to describe a method in which a core included in a processor, according to an embodiment, implements a thread.

FIG. 4 is a flowchart to describe a method that a core (such as, the core 122) included in the processor 100, according to an embodiment, implements a thread.

In FIG. 4, it is assumed that implementation of the $0^{th}$ thread set allocated to a core (such as, the core 122 of FIG. 1) for the first place is completed before $0^{th}$ thread sets respectively allocated to the other cores (such as, the cores 124, 126, and 128 of FIG. 1) for the first place.

In an operation S410, the core implements at least one or more thread sets allocated by the memory 110, according to a pre-set implementation order. For example, the core determines the implementation order according to the GTO scheduling technique, such that the $0^{th}$ thread set, which is the thread set allocated for the first place, is implemented at the highest priority.

In an operation S420, the core determines scheduling information based on an implementation pattern regarding the at least one or more allocated thread sets.

The core identifies and records a number of implemented threads included in at least one or more allocated thread sets, according to types of thread sets including the threads. In another example, the core also records identification information regarding implemented threads together with identification information regarding thread sets including the threads.

The core determines an implementation pattern based on distribution of number of implemented threads in respective thread sets. The core stores in advance information regarding implementation patterns corresponding to respective scheduling techniques. For example, the core matches a first pattern to the GTO scheduling technique and stores in advance information regarding the first pattern. For instance, the first pattern is a concave pattern. In another example, the core matches a second pattern to the RR scheduling technique and stores in advance information regarding the second pattern. For instance, the second pattern is a convex pattern.

Further, detailed descriptions of implementation patterns will be given below with reference to FIG. 6A.

The core, according to an embodiment, selects a scheduling technique corresponding to a determined implementation pattern. The core determines a relationship between at least one or more thread sets allocated to the core based on the determined implementation pattern. For example, based on the determined implementation pattern, the core determines whether a relationship between at least one or more thread sets allocated to the core is a parallel relationship or a subordinative relationship.

The core selects a scheduling technique optimized to at least one or more allocated thread sets in consideration of the implementation pattern.

In an operation S430, the core transmits determined scheduling information to a controller connected to a plurality of cores including the core.

The core, according to an embodiment, transmits scheduling information indicating the selected scheduling technique to the controller 130. The scheduling information is transmitted to at least one of the other cores via the controller.

In an operation S440, the core re-determines an implementation order regarding at least one or more allocated thread sets based on the determined scheduling information.

The core re-determines an implementation order regarding thread sets, for which implementations are not completed, according to a scheduling technique indicated by the scheduling information.

For example, in response to a pre-set scheduling technique being different from a selected scheduling technique, the core determines an implementation order regarding thread sets, for which implementations are not completed, from among at least one or more thread sets according to the determined scheduling technique. In another example, in response to a pre-set scheduling technique being identical to a selected scheduling technique, the core maintains the pre-set scheduling technique.

Figure 5:
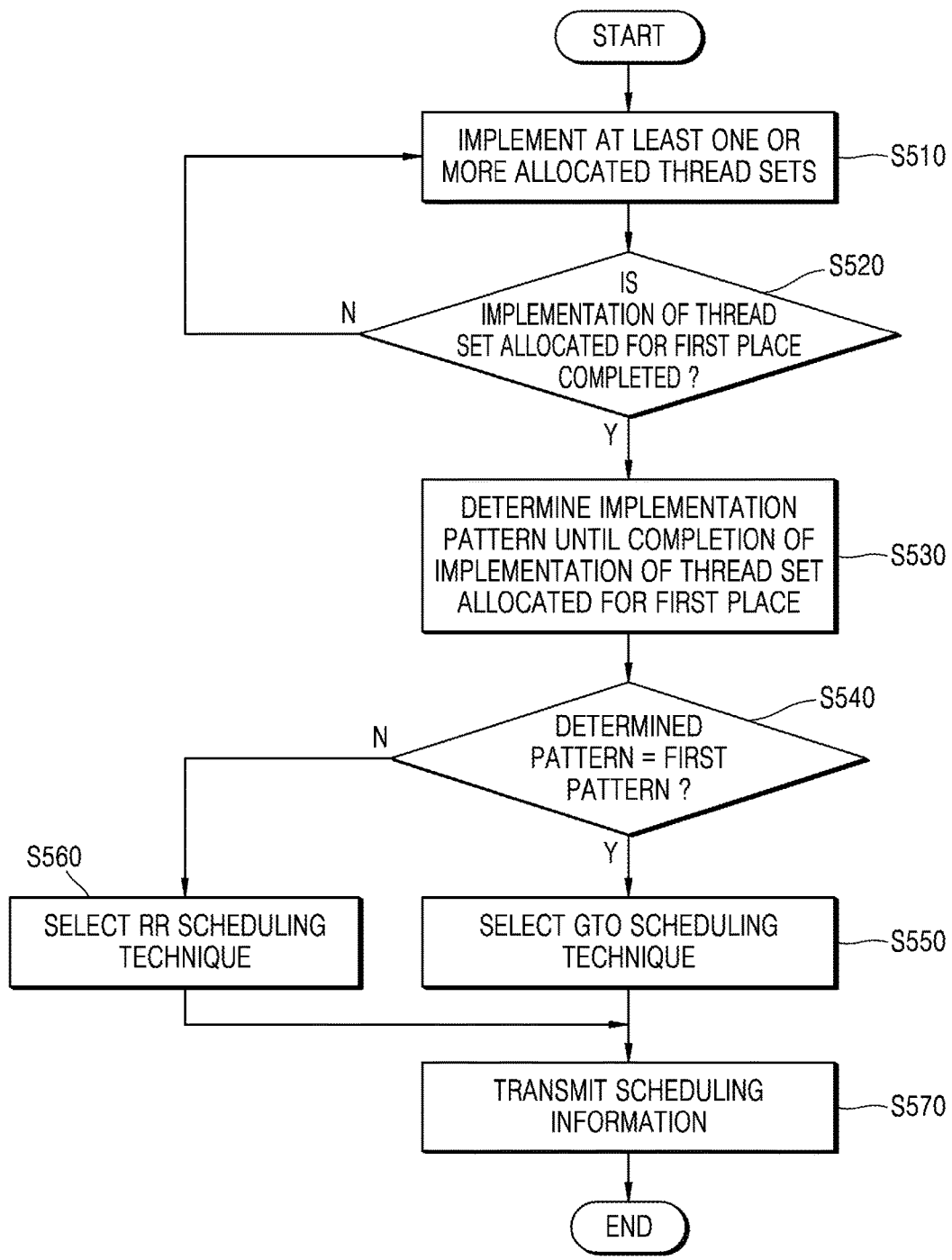
FIG. 5 is a flowchart to describe a method in which a core according to an embodiment determines scheduling information in closer detail.

FIG. 5 is a flowchart to describe a method that the core, according to an embodiment, determines scheduling information in closer detail.

In an operation S510, the core implements at least one or more thread sets allocated by the memory 110 based on a pre-set implementation order.

Further, the operation S510 corresponds to the operation S410 described above with reference to FIG. 4.

In an operation S520, the core determines whether implementation of the thread set allocated for the first place is completed.

The core records information regarding implementations of threads included in each of thread sets. The core determines whether implementation of the $0^{th}$ thread set, which is the thread set allocated for the first place, from among the thread sets is completed based on the recorded information regarding implementations of the threads.

In an operation S530, the core determines an implementation pattern based on numbers of threads implemented in each of the other thread sets, until implementation of the thread set allocated for the first place is completed.

The core stores in advance information regarding implementation patterns corresponding to respective scheduling techniques. For example, the core matches a concave pattern (first pattern) to the GTO scheduling technique and stores in advance information regarding the first pattern. In another example, the core (matches a convex pattern (second pattern) to the RR scheduling technique and stores in advance information regarding the second pattern.

For example, in response to numbers of threads implemented in the respective thread sets being evenly distributed, the core determines the corresponding implementation pattern as a convex implementation pattern. In another example, in response to numbers of implemented threads being concentrated at threads that are allocated earlier than the other thread sets, the core determines the corresponding implementation pattern as a concave implementation pattern.

In an operation S540, the core determines whether the determined implementation pattern is the first pattern. In an example, although the first pattern is a concave pattern, the first pattern is not limited thereto such pattern and other patterns may define the first pattern.

In an operation S550, the core selects the GTO scheduling technique.

In response to the determined implementation pattern corresponding to the first pattern, the core selects the GTO scheduling technique. In response to the implementation pattern being a concave pattern (first pattern), the core (determines that the distribution of threads included in the $0^{th}$ thread set, which are in a subordinative relationship with threads included in the other thread sets, is not high. Therefore, the core selects the GTO scheduling technique for scheduling to implement the $0^{th}$ thread set at higher priority than the other thread sets.

In an operation S560, the core selects the RR scheduling technique.

In response to the determined implementation pattern not corresponding to the first pattern, the core selects the RR scheduling technique. In the embodiment shown in FIG. 5, for illustrative purposes only, the implementation pattern is either the first pattern or the second pattern.

In response to the implementation pattern being a convex pattern (second pattern), the core determines that distribution of threads included in the $0^{th}$ thread set, which are in a subordinative relationship with threads included in the other thread sets, is high. Therefore, the core selects the RR scheduling technique for scheduling to equally implement all thread sets.

In an operation S570, the core transmits scheduling information indicating the selected scheduling technique to the controller 130.

Further, the operation S570 corresponds to the operation S440 described above with reference to FIG. 4.

Figure 6A:
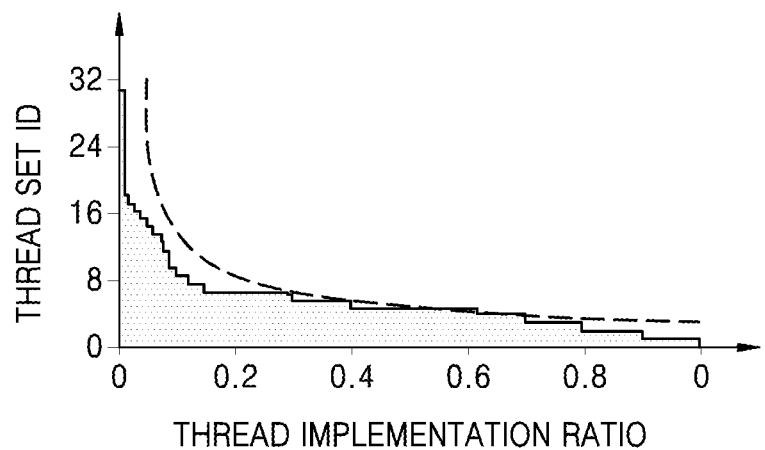
FIGS. 6A and 6B are diagrams describing an implementation pattern regarding at least one or more thread set according to an embodiment.
Figure 6B:
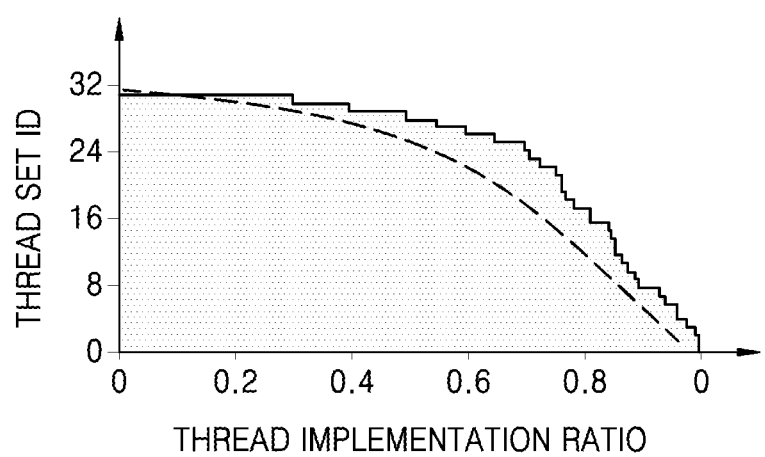

FIGS. 6A and 6B are diagrams describing an implementation pattern regarding at least one or more thread set, according to an embodiment.

FIG. 6A is a diagram describing a case in which numbers of threads implemented in respective thread sets exhibits a concave pattern.

In the graph shown in FIG. 6A, the x-axis indicates a ratio between implemented threads and threads included in the respective thread sets. Furthermore, in the graph shown in FIG. 6A, the y-axis indicates identification information regarding thread sets.

Referring to FIG. 6A, the threads included in the $0^{th}$ thread set allocated for the first place exhibit the highest implementation ratio. Furthermore, implementation ratios regarding threads included in the other thread sets are significantly different from the ratio regarding threads implemented in the $0^{th}$ thread set. In response to an implementation pattern being a concave pattern, the core determines that distribution of threads included in the $0^{th}$ thread set, which are in a subordinative relationship with threads included in the other thread sets, is not high.

Thus, in response to an implementation pattern regarding at least one or more allocated thread sets corresponds to a concave pattern, the core selects the GTO scheduling technique to implement the $0^{th}$ thread set at higher priority than the other thread sets.

However, it is merely an example, and the technical examples disclosed herein are not limited thereto.

FIG. 6B is a diagram to describe a case in which numbers of threads implemented in respective thread sets exhibits a convex pattern.

In the graph shown in FIG. 6B, the x-axis indicates a ratio between implemented threads and threads included in the respective thread sets. Furthermore, in the graph shown in FIG. 6B, the y-axis indicates identification information regarding thread sets.

Referring to FIG. 6B, implementation ratios regarding threads included in the other thread sets are not significantly different from the ratio regarding threads implemented in the $0^{th}$ thread set.

Therefore, in response to an implementation pattern regarding at least one or more allocated thread sets corresponding to a concave pattern, the core determines that distribution of threads included in the $0^{th}$ thread set, which that are in a subordinative relationship with threads included in the other thread sets, is high.

Therefore, the core selects the RR scheduling technique to equally implement all thread sets.

Figure 7:
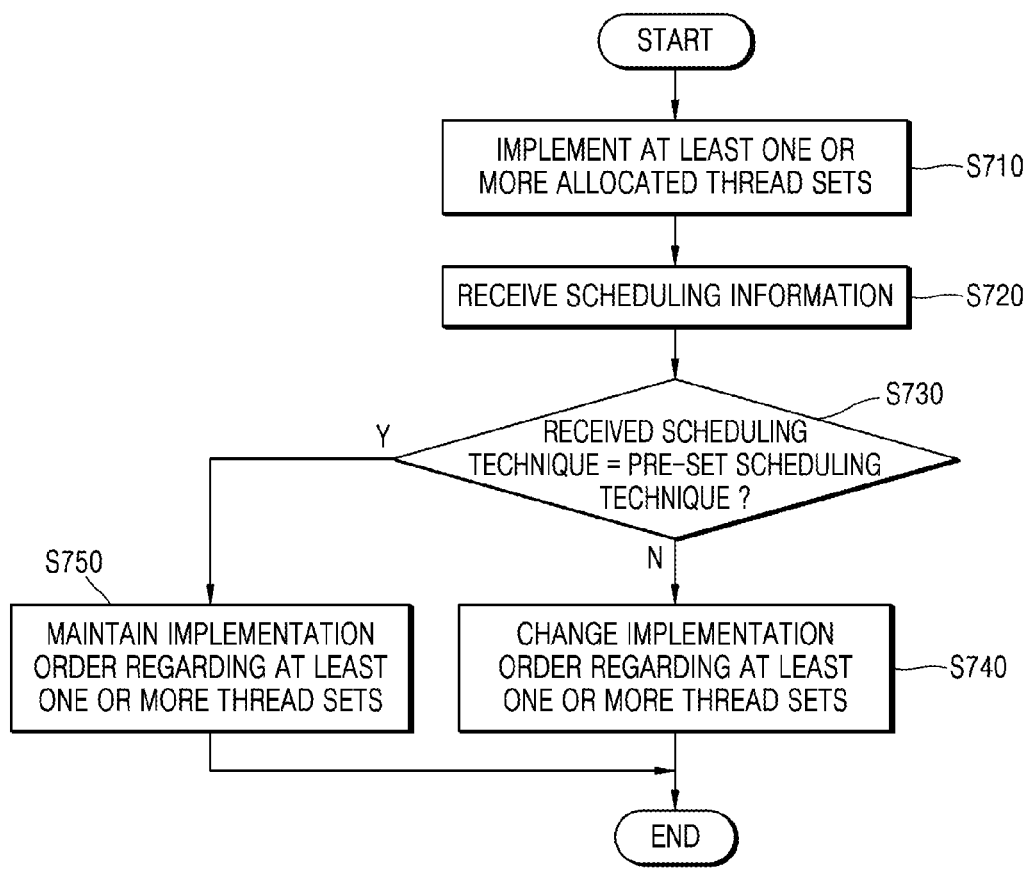
FIG. 7 is a flowchart to describe a method in which a first core, according to an embodiment, determines an implementation order regarding at least one or more thread sets based on scheduling information determined by a second core.

FIG. 7 is a flowchart to describe a method in which the first core 122, according to an embodiment, determines an implementation order regarding at least one or more thread sets based on scheduling information determined by the second core 124.

In an operation S710, according to a pre-set implementation order, the first core 122 implements at least one or more thread sets allocated by the memory 110. For example, the first core 122 determines an implementation order according to the GTO scheduling technique, such that the $0^{th}$ thread set, which is the thread set allocated for the first place, is implemented at the highest priority.

In an operation S720, the first core 122 receives scheduling information determined by the second core 124 from the controller 130.

The second core 124, according to an embodiment, is the core that completed implementation of a selected thread set before the other cores from among the plurality of cores 122, 124, 126, and 128. In an example, the selected thread set is the $0^{th}$ thread set allocated to each of the cores for the first place.

Further, a method by which the second core 124 determines scheduling information is same as or similar to the methods described above with reference to FIGS. 4 and 5.

In an operation S730, the first core 122 determines whether a scheduling technique indicated by the received scheduling information corresponds to a pre-set scheduling technique.

For example, the first core 122 receives scheduling information while the first core 122 is implementing at least one or more thread sets allocated according to the pre-set GTO scheduling technique. The first core 122 determines whether the scheduling technique indicated by the scheduling information corresponds to the GTO scheduling technique or a scheduling technique other than the GTO scheduling technique. In an example, an example of the scheduling technique, other than the GTO scheduling technique, includes the RR scheduling technique.

In an operation S740, the first core 122 changes an implementation order of at least one or more thread sets.

In response to a pre-set scheduling technique being different from the selected scheduling technique, the core determines an implementation order regarding threads that are not yet implemented based on the determined scheduling technique.

In an operation S570, the first core 122 maintains an implementation order of at least one or more thread sets.

In response to a pre-set scheduling technique being identical to the selected scheduling technique, the core maintains the pre-set scheduling technique.

Figure 8:
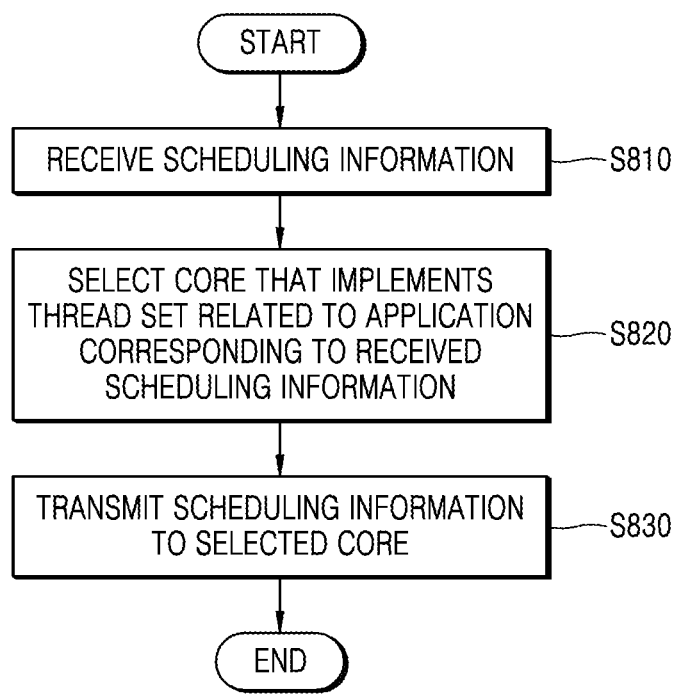
FIG. 8 is a flowchart to describe a method in which a controller, according to an embodiment, transmits scheduling information when a plurality of applications are implemented on a plurality of cores.

FIG. 8 is a flowchart to describe a method that the controller 130, according to an embodiment, transmits scheduling information when a plurality of applications are implemented on the plurality of cores 122, 124, 126, and 128.

In FIG. 8, in an example, the first core 122 and the second core 124 implement at least one or more thread sets related to an application A, and the third core 126 and the fourth core 128 implement at least one or more thread sets related to an application B.

In an operation S810, the controller 130 receives scheduling information from at least two or more cores from among the plurality of cores 122, 124, 126, and 128.

The controller 130, according to an embodiment, receives scheduling information regarding at least one or more thread sets related to the application A from at least one of the first core 122 and the second core 124. Furthermore, the controller 130 receives scheduling information regarding at least one or more thread sets related to the application B from at least one of the third core 126 and the fourth core 128.

In an operation S820, the controller 130 selects the core that implements a thread set related to an application corresponding to the received scheduling information.

Scheduling information, according to an embodiment includes identification information regarding an application. The controller 130 checks identification information regarding an application included in the scheduling information and selects a core to transmit scheduling information. For example, scheduling information received by the controller 130 from the first core 122 includes identification information indicating the application A. The controller 130 checks identification information regarding an application included in the scheduling information and selects the first core 122 that implements at least one or more thread sets related to the application A.

In an operation S830, the controller 130 transmits scheduling information to the selected core.

The selected core, according to an embodiment, determines a scheduling technique optimized to thread sets related to an application implemented on the selected core.

The structural elements illustrated in FIGS. 1-3 described herein include, for example, a processor, a memory to store program data and executing it, a permanent storage processor such as a disk drive, a communications port to handle communications with external devices, and user interface devices, including a touch panel, keys, buttons, etc.

A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4, 5, and 7-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 5, and 7-8 that perform the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor, comprising:
cores comprising a thread set allocated based on a pre-set implementation order; and
a controller that receives scheduling information determined based on an implementation pattern regarding the allocated thread set from one core of the cores and transmits the scheduling information to another core of the cores,
wherein the one core determines the scheduling information according to characteristics of an application when implementation of the thread set is completed, and
each of the cores re-determines an implementation order regarding the allocated thread set based on the determined scheduling information;
wherein the one core determines scheduling information based on the implementation order obtained when implementation of a selected thread set from among allocated thread sets is completed;
wherein, in response to an implementation pattern of the thread set being a first pattern, the one core selects a greedy-the-oldest (GTO) scheduling technique;
in response to an implementation pattern of the thread sets being a second pattern, the one core selects a round-robin (RR) scheduling technique.

2. The processor of claim 1, further comprising:
a memory that stores thread sets to implement the application.

3. The processor of claim 1, wherein the one core is a core at which implementation of a selected thread set from among allocated thread sets is completed for a first place.

4. The processor of claim 3, wherein the selected thread set is the thread set allocated to the one core for the first place.

5. The processor of claim 1, wherein each of the cores re-determines an implementation order of thread sets, comprising incomplete implementations, based on the scheduling information.

6. The processor of claim 5, wherein,
in response to the pre-set scheduling information not being identical to the determined scheduling information,
one of the other cores changes the implementation order based on a scheduling technique indicated by the determined scheduling information.

7. The processor of claim 1, wherein the processor is a graphic processor.

8. A method of implementing threads on a processor that includes a plurality of cores, the method comprising:
implementing a thread set allocated to one core of the plurality of cores to implement an application based on a pre-set implementation order;
determining scheduling information based on characteristics of the application in response to implementation of the thread set being completed;
transmitting the determined scheduling information to a controller operatively connected to cores comprising the core; and
re-determining by each of the plurality of cores an implementation order of the allocated thread set based on the determined scheduling information;
wherein determining the scheduling information comprises:
determining the scheduling information based on the implementation order obtained in response to implementation of the selected thread set being completed;
wherein, in response to an implementation pattern of the thread set being a first pattern, the method further comprises selecting a greedy-then-oldest (GTO) scheduling technique; and wherein, in response to an implementation pattern of the thread set being a second pattern, the method further comprises selectin a round-robin (RR) scheduling technique.

9. The method of claim 8, wherein the one core is a core at which implementation of a selected thread set from among allocated thread sets is completed for a first place.

10. The method of claim 9, wherein the selected thread set is the thread set allocated to the one core for the first place.

11. The method of claim 8, wherein, the re-determining of the implementation order comprises re-determining, by each of the plurality of cores, thread sets comprising incomplete implementations based on the scheduling information.

12. The method of claim 8, wherein the re-determining of the implementation order comprises in response to the pre-set scheduling information not being identical to the determined scheduling information, changing the implementation order based on a scheduling technique indicated by the determined scheduling information.

13. The method of claim 8, wherein the processor is a graphic processor.

14. A computer program embodied on a non-transitory computer readable medium, the computer program being configured to control a processor to perform the method of claim 8.

* * * * *